(No Model.)
T. H. APGAR.
NUT LOCK.
No. 461,515. Patented Oct. 20, 1891.
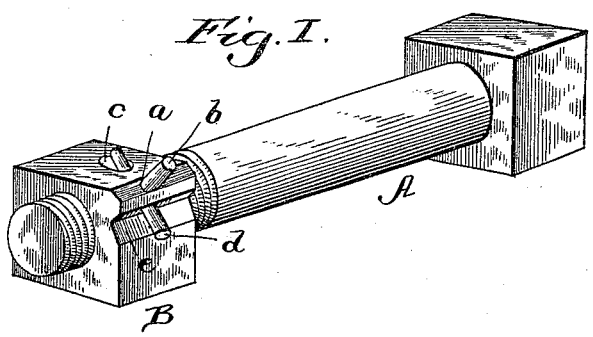
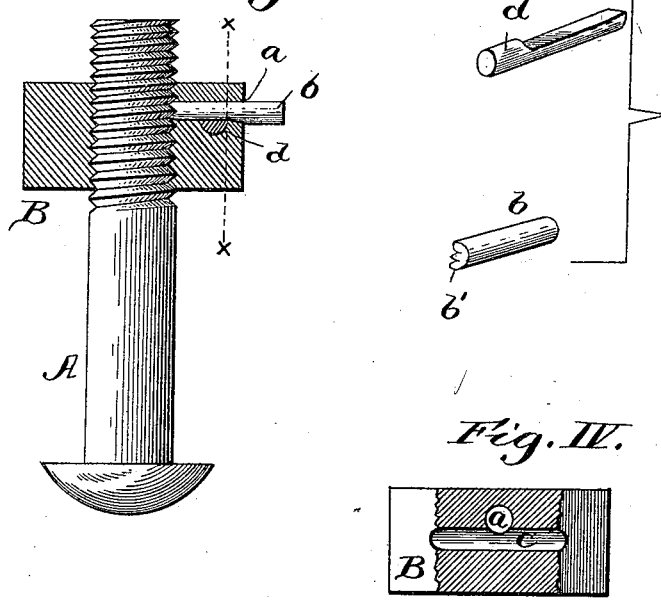
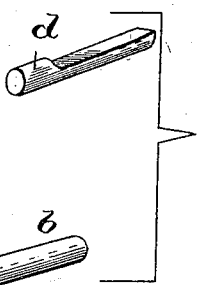
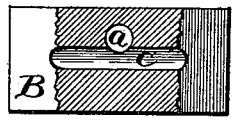
Witnesses:
J. B. McGirr.
Arthur L. Bryant
Inventor:
Theodore H. Apgar.
By his Attorneys

UNITED STATES PATENT OFFICE.

THEODORE H. APGAR, OF BOUND BROOK, NEW JERSEY.

NUT-LOCK.

SPECIFICATION forming part of Letters Patent No. 461,515, dated October 20, 1891.

Application filed May 13, 1891. Serial No. 392,613. (No model.)

*To all whom it may concern:*

Be it known that I, THEODORE H. APGAR, a citizen of the United States, residing at Bound Brook, in the county of Somerset and State of New Jersey, have invented certain new and useful Improvements in Nut-Locks; and I do hereby declare the following to be a full, clear, and exact description of the invention, such as will enable others skilled in the art to which it appertains to make and use the same.

My invention relates to improvements in devices for securing nuts in position on bolts; and the objects of my invention are, first, to provide a simple, cheap, and effective device for locking a nut against rotation on a bolt, which device can be quickly removed to change the position on or remove the nut from the bolt, and, second, to provide a fastening which will not destroy the usefulness of the nut on which it is placed.

With these ends in view my invention consists in a nut provided with a radial passage extending from the outer surface to the central threaded opening of the nut and another diagonal passage extending from one face or surface of the nut to another face at an angle to the radial passage, and pins fitted in said passages and contacting one with the other, the inner end of one of said pins engaging with the threaded end of the bolt on which the nut is placed.

My invention further consists in the peculiar construction and arrangement of parts, as will be hereinafter more fully pointed out and claimed.

To enable others to more readily understand my invention, I have illustrated the same in the accompanying drawings, in which—

Figure I is a perspective view of a nut fitted on a bolt and having my improved fastening applied thereto. Fig. II is an enlarged sectional view through the nut and bolt, and Fig. III is a detail view of the locking-pins. Fig. IV is a detail view of nut with pins removed.

Like letters of reference denote corresponding parts in the several figures of the drawings, in which—

A designates a bolt, on which is fitted a nut B. The nut B is provided with a radial passage $a$, which extends from the outer surface of the nut to the central threaded opening in the nut. Within the passage $a$ is fitted a pin $b$, the inner end of which engages with the threaded portion of the bolt A. One surface $b'$ of this pin $b$ is flattened, as shown in Fig. III. The nut B is also provided with another passage $c$, which extends from one face or surface of the nut (at an angle to the passage $a$, with which it intersects) to an adjacent or adjoining face of the nut. In this passage $c$ is fitted a pin $d$, which has one of its surfaces made flat, said surface contacting with the flat surface $b'$ on the pin $b$.

The method of applying my lock is as follows: The nut is first screwed or turned the proper distance on the bolt A, and the pin $b$ is then forced into the passage $a$ with its flat surface down, and its inner end, which is preferably serrated, as shown in Fig. III, takes into the threaded portion of the bolt. The pin $d$ is then inserted in the passage $c$ with its flattened surface uppermost. The pin $d$ operates as a wedge to force the pin $b$ closely against the walls of the passage $a$ and the thread of the bolt, and the latter pin is held so tight that its inner end cannot be disengaged from the thread of the bolt or the pin itself be removed from the nut without first removing the wedging or confining pin $d$. The inner end of the pin $b$ is forced into such close contact with the thread of the bolt that it cannot move, and the nut is thus held firmly in place.

To remove the nut the pin $d$ is forced out of the passage $c$, and then the pin $b$ can be readily removed to allow the nut to be turned on the bolt. It will be noticed that this device does not in any way impair the usefulness of the nut, which may be used as often as desired.

To facilitate the removal of the pin $d$, I form in one face of the nut a re-entrant angle $e$, through which one end of the passage $c$ opens.

I am aware that changes in the form and proportion of parts and details of construction of the devices herein shown and described as an embodiment of my invention can be made without departing from the spirit or sacrificing the advantages thereof, and I therefore reserve the right to make such changes as fairly fall within the scope of my invention.

Having thus fully described my invention, what I claim as new, and desire to secure by Letters Patent, is—

The combination, with a bolt, of a nut provided with the intersecting horizontal passages $a$ $c$, arranged at right angles to each other, and the pins $b$ $d$, fitted in said passages and having their meeting surfaces flattened, the pin $b$ extending from one side of the nut to the central threaded passage therein, and the pin $d$ extending from one face of the nut to an adjoining face, substantially as shown and described.

In testimony whereof I affix my signature in presence of two witnesses.

THEODORE H. APGAR.

Witnesses:
 J. G. SMITH, Jr.,
 ROBT. T. BRAMPTON.